United States Patent [19]
Ishihara

[11] Patent Number: 5,519,812
[45] Date of Patent: May 21, 1996

[54] FERRELECTRIC ADAPTIVE-LEARNING TYPE PRODUCT-SUM OPERATION CIRCUIT ELEMENT AND CIRCUIT USING SUCH ELEMENT

[75] Inventor: Hiroshi Ishihara, Tokyo, Japan

[73] Assignee: Tokyo Institute of Technology, Tokyo, Japan

[21] Appl. No.: 26,779

[22] Filed: Mar. 5, 1993

[30] Foreign Application Priority Data

Aug. 24, 1992 [JP] Japan ................... 4-224111

[51] Int. Cl.[6] ............ H01L 29/772; G11C 11/22; H03K 19/094
[52] U.S. Cl. ............ 395/24; 326/112; 257/295; 365/145
[58] Field of Search ............ 257/295; 365/145; 307/201, 450; 326/112; 395/24

[56] References Cited

U.S. PATENT DOCUMENTS

| | | | |
|---|---|---|---|
| 3,832,700 | 8/1974 | Wu et al. | 365/145 |
| 4,151,020 | 4/1979 | McElroy | 365/104 |
| 4,184,207 | 1/1980 | McElroy | 365/104 |
| 4,782,460 | 11/1988 | Spencer | 307/201 |
| 4,873,455 | 10/1989 | de Chambost et al. | 307/201 |
| 5,004,932 | 4/1991 | Nejime | 307/201 |
| 5,058,184 | 10/1991 | Fukushima | 382/37 |
| 5,065,132 | 11/1991 | Taddiken et al. | 307/201 |
| 5,070,385 | 12/1991 | Evans, Jr. et al. | 365/145 |
| 5,300,799 | 4/1994 | Nakamura et al. | 257/295 |

FOREIGN PATENT DOCUMENTS 2621757  4/1989  France .

OTHER PUBLICATIONS

Chen, John Y.; CMOS Devices and Technology for VLSI; © 1990 by Prentice-Hall; pp. 277–278.

Ishiwara, H., "A Proposal of Self-Learning Neuron Circuits with High-Density Synapse Connections of Ferroelectric Thin Films", Int. Conf. on Solid State Devices & Materials (Aug., 1992) pp. 689–690.

Gekkan Semiconductor World, vol. 11, (Jan. 1992) pp. 98–101.

*Primary Examiner*—Edward P. Westin
*Assistant Examiner*—Benjamin D. Driscoll
*Attorney, Agent, or Firm*—Spencer & Frank

[57] ABSTRACT

The present invention relates to a product-sum operation circuit element and a circuit for addition by weighting a number of signals input in one neuron circuit in a neural network, and can provide an adaptive-learning neuron circuit for changing an interval of output pulses by learning by connecting a simple pulse generating circuit consisting of capacitance, resistance, unijunction transistor and the like.

A product-sum operation circuit element according to the present invention, includes an insulator substrate, a single crystal semiconductor thin film having a p-n-p or n-p-n structure in a lateral direction formed in the shape of stripes on the insulator substrate, a ferroelectric thin film deposited thereon for covering at least the semiconductor stripe structure, and a stripe-like electrode consisting of a metal or a polycrystalline semiconductor further formed thereon for intersecting the semiconductor stripes at a right angle or suitable angle.

8 Claims, 8 Drawing Sheets

FIG_4A

FIG_4B

FIG_7A

FIG_7B

FERRELECTRIC ADAPTIVE-LEARNING TYPE PRODUCT-SUM OPERATION CIRCUIT ELEMENT AND CIRCUIT USING SUCH ELEMENT

BACKGROUND OF THE INVENTION

1. Field of the Invention

The present invention relates to an adaptive-learning type product-sum operation circuit element, an adaptive-learning type product-sum operation circuit and an adaptive-learning type product-sum operation circuit array for weighing and adding a number of signals input into a plurality of neuron circuits in a neural network.

2. Related Art Statement

As a method of giving a weight function to the input portion of a neuron circuit, i.e., synaptic connection, there are two methods of giving a value obtained by software simulation as a certain value and of determining the optimum value by learning with a teacher after the construction of a network.

Both methods have a problem of enormously increasing learning time in a practical network having more than 10,000 neurons.

The present invention is to obviate the aforesaid shortcoming. The present invention relates to a circuit for making the weight of synaptic connection the optimum by adaptive-learning with the aid of residual polarization of a ferroelectric film, and when this circuit is used, even if the use of a network is started under such a condition that the weight of synaptic connection is not the optimum, a function of making the weight of synaptic connection the optimum as the use is progressed can be expected. A specific circuit constructs a matrix of synaptic connection of m×n by connecting in parallel adaptive-learning type MISFET (metal-insulator-semiconductor field effect transistors) with the use of a ferroelectric thin film as a gate insulating film by m stages equal to a number of input signals to form synaptic connection of one neuron circuit, and further aligning the MISFETs for other neuron circuits so that n rows are formed in total.

SUMMARY OF THE INVENTION

The characteristics of the present invention lie in the following points.

An object of the present invention is to provide a product-sum operation circuit comprising an insulator substrate, a single crystal semiconductor thin film having a p-n-p or n-p-n structure in a lateral direction formed in the shape of stripes on the insulator substrate, a ferroelectric thin film deposited thereon for covering at least the semiconductor stripe structure, and a strip-like electrode consisting of a metal or a polycrystalline semiconductor further formed thereon for intersecting the semiconductor stripes at a right angle or suitable angle.

Another object of the present invention is to provide an adaptive-learning type product-sum operation circuit comprising a neuron circuit as a constituent having such an adaptive-learning function that a parallel circuit of adaptive-learning type MISFET is connected to a capacitance C in series, resistances $R_2$ and $R_3$ are made the other sides of a bridge and connected by a unijunction transistor (UJT), and a junction point of the MISFET and capacitance C is connected to the UJT for narrowing an interval between output pulses by a positive excitatory control signal entered into the MISFET and widening an interval between output pulses by a negative inhibitory control signal entered into the other MISFET.

Still another object of the invention is to provide an adaptive-learning type product-sum operation circuit, comprising a photoconductor PC1 conducted by an excitatory optical information input signal and a photoconductor PC2 conducted by an inhibitory optical information input signal connected in series between positive and negative terminals, a series circuit of a capacitance C and an adaptive-learning type FET connected between the positive and earth terminals, an LED and a series circuit of a UJT and a resistance are connected in parallel, a junction point of the photoconductors is connected to a gate electrode of the adaptive-learning type FET, an intersecting point of the adaptive-learning type FET and the capacitance C is connected to the UJT, the circuit comprising an excitatory and inhibitory controls device for narrowing and widening a pulse interval of output pulses by receiving optical information input signals in PC1 and PC2, respectively.

Yet another object of the present invention is to provide an adaptive-learning type product-sum operation circuit comprising a series circuit of a p-channel MOSFET switch 18 conducted by an excitatory information input signal and an n-channel MOSFET switch 19 conducted by an inhibitory information input signal connected between positive and negative terminals, a series circuit of a capacitance C and an adaptive-learning type MISFET, a series circuit of a resistance 26, a UJT 42 and a resistance R, these circuits being connected in parallel, respectively a junction point 20 of the FET switches 18 and 19 being connected to a gate electrode of the adaptive-learning type FET, a junction point 21 of the adaptive-learning type FET and capacitance C being connected to the UJT, a junction point 22 of the UJT and resistance 26 being branched from an excitatory information output terminal 24 and connected to a gate electrode of said p-channel MOSFET, an inhibitory information output terminal 25 provided between the resistances 28 and 29, further comprising a excitatory control device for narrowing a pulse interval of an output pulse voltage and inhibitory control device for widening a pulse interval of an output pulse voltage.

Yet still another object of the present invention is to provide an adaptive-learning type product-sum operation circuit array comprising an array network of neuron circuits of m×n by providing m stages of a series circuit of a photoconductor PC1 conducted by an excitatory optical information input signal, neuron circuits of n rows and a photoconductor PC2 conducted by an inhibitory optical information input signal between positive and negative terminals, an excitatory control device for narrowing an interval of output pulses of each neuron circuit element by excitatory control signals, and an inhibitory control device for widening an interval of output pulses of each neuron circuit element by an inhibitory control signal, and further comprising adaptive-learning functions such as a complement of a displaced or missing letter or pattern of input picture information.

Yet still another object of the present invention is to provide an adaptive-learning type product-sum operation circuit array comprising an array network of neuron circuits of m×n by providing m stages of a series circuit of a semiconductor switch conducted by an excitatory electric input signal, n rows of neuron circuits and a semiconductor switch conducted by an inhibitory electric information input signal between positive and negative terminals, an excitatory control device for narrowing an interval of output pulses of each neuron circuit by excitatory control signals and an inhibitory control device for widening an interval of output pulses of each neuron circuit by inhibitory control signals, and further comprising adaptive-learning functions such as a complement of a displaced or missing letter or pattern of an input electric information signal.

Here, a semiconductor stripe on an insulator substrate corresponds to a portion where metal-insulator-semiconductor field effect type transistors (MISFETs) are connected in parallel, and the uppermost metal or polycrystalline semiconductor electrode corresponds to gate electrodes of the MISFETs. This structure is characterized by enabling to give a field which can change residual polarization of a ferroelectric film only at a gate insulating film of FET of an intersecting point between a semiconductor stripe and a gate electrode stripe to where a suitable voltage is given. Therefore, when this novel characteristic is used, initial weights of every synapse can be set independently.

When a simple pulse generating circuit consisting of a capacitance, a resistance, a unijunction transistor and the like is connected to a circuit according to the present invention, there can be manufactured an adaptive-learning neuron circuit which changes an interval of output pulses by learning.

BRIEF DESCRIPTION OF THE DRAWINGS

For a better understanding of the invention, reference is made to the accompanying drawing, in which.

Throughout the specification, same reference numeral designate same object or body, for example.

1 is a source, 2 is a drain, 3 is a gate, 4 is a ferroelectric film, 5 is a p-type (n-type) semiconductor, C is a capacitance, $R_1$, $R_2$, $R_3$ are resistances, 6 is an input terminal, 7 is an output terminal, 8 is a bias voltage terminal, 9, 14, 30 are $+V_0$ terminals, 10, 15, 31 are $-V_0$ terminals, 11, 12 are intermediate points, 16, 17 are input terminals, 18, 19 are FET switches, 20, 21, 22, 27 are intermediate points, 13, 23 are earth terminals, 24, 25 are output terminals, 26, 28, 29 are resistances, 34 is an optical output portion, 35 is an insulator substrate, 36, 37 are Si stripes, 38 is a ferroelectric thin film, 39 is a gate electrode, 40 is a p-channel MOSFET, 41 is an adaptive-learning type MISFET, 42 is a unijunction transistor (UJT), 45, 46 are FET switches, UJT is a unijunction transistor, PC1 is an excitatory photoconductor, PC2 is an inhibitory photoconductor, 47 is an output terminal.

DESCRIPTION OF THE PREFERRED EMBODIMENT

The present invention is an adaptive-learning neuron circuit having a high density synapse connection consisting of a ferroelectric thin film. The circuit construction of the present invention will be explained by referring to the accompanying drawings in detail.

An adaptive-learning function of an electron device is first described and then the adaptive-learning type MISFET of the present invention and the principle construction of adaptive-learning function of an adaptive-learning neuron circuit with the use of the MISFET is explained.

(1) Adaptive-learning function in the electron device

The present inventor thinks that the adaptive-learning function has the following two properties:

① Function for changing or complementing a part or the whole of electrical or optical properties of a device during a period of processing a certain number of usual signals; and ② Function for returning to the initial state by inputting an initializing signal.

That is, function ① means a function for changing a normally OFF-type FET to a normally ON-type FET during a period of applying a certain number of input signals to a gate, and function ② means a function for generating a change of the properties under the sufficiently controlled condition, different from deterioration of a device by input signals.

A function similar to this adaptive-learning function is to apply a special control signal different from a usual signal to change the condition of a device. This function is different from the adaptive-learning function in the point of using a control signal, which is specified as a self-control function by the present inventor. A typical self-control device is an electrically erasable non-volatile memory (EEPROM), wherein a read-out signal corresponds to a usual signal, and a write-in signal and an erase signal correspond to special control signals.

(2) Operational principle of the adaptive-learning type MISFET

Figure 1A:
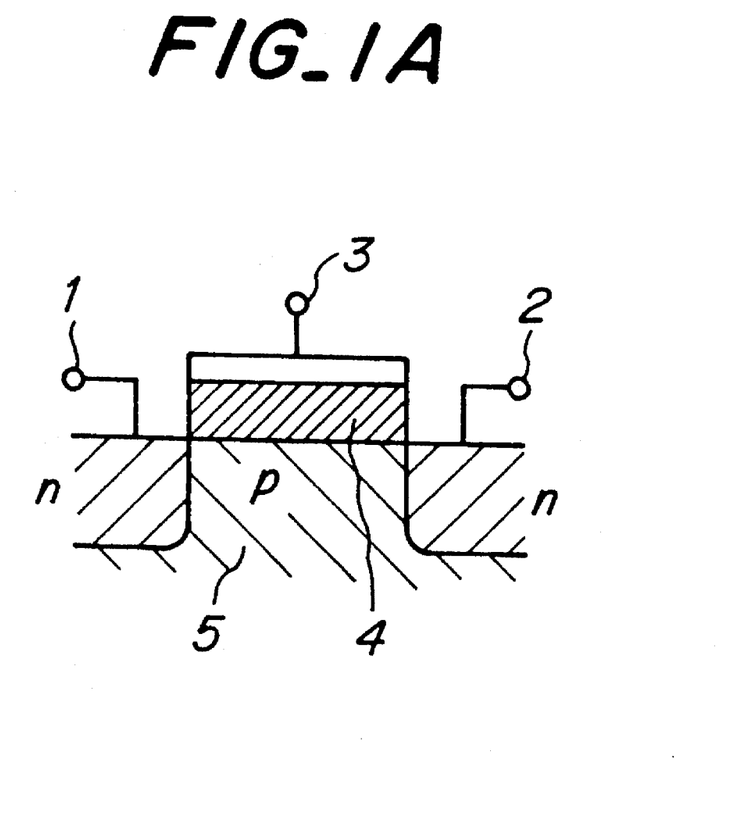
FIGS. 1(A) and 1(B) are a principle explanatory view and its equivalent circuit diagram of the present circuit.
Figure 1B:
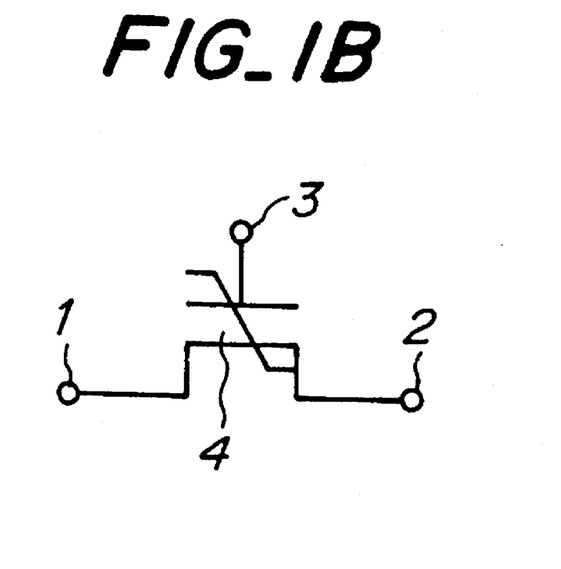

The adaptive-learning type MISFET proposed by the present invention has the same general structure as that of the usual MOSFET as shown in a schematic diagram of FIG. 1, but the point of using a ferroelectric thin film as a gate insulating film is novel. FIG. 1 shows an enhancement type FET of an n channel, and when a positive pulse voltage is applied to a gate, an inversion layer is formed at a channel portion in case of applying a pulse and the FET turns ON. At the same time, polarization is generated in the ferroelectric thin film, and this polarization remains even after the voltage is back to 0, so that a fixed conductive layer is formed on the surface of a semiconductor after several pulses are applied, and a path between the source and drain is ON even after the gate voltage is made 0. That is, the FET is changed to a normally ON-type FET by learning.

(3) Quantitative analysis of the MIS diode

In order to quantitatively examine the operation of the FET shown in FIG. 1, it is necessary to clarify the switching properties of a ferro electric thin film in the first place. The ferroelectric thin film requires a switching time $t_s$ for inverting spontaneous polarization $P_s$. The switching time in case of applying an electric field E more than a coercive electric field $E_c$ is expressed by the following formula.

$$t_s = t_{so} exp\ (E_a/E) \ldots \quad (1)$$

where, $E_a$ is an activation field, which value changes according to the kind of a ferroelectric material. The above equation shows that in general, the stronger the applied electric field, the shorter time the polarization is inverted.

Next, a time change of polarization after the electric field E is applied at time t=0 is shown by the following formula.

$$P = P_s[1 - 2exp\{-(t/t_s)^n\}] \ldots \quad (2)$$

where, n is a growth dimension of a domain, and in case of a thin film, n=2.5 is theoretically obtained. The formula (2) shows the state of changing the polarization P from $-P_s$ of the time t=0 to $+P_s$ of the time t=∞, but its change is continuous, and in case of finite t, P takes an appropriate value between $-P_s$ and $+P_s$. It is further considered that P is maintained at the same value after E is made zero at room temperature, so that residual polarization after applying n times of pulses of pulse width τ is obtained by placing t=nτ in formula (2).

Figure 2:
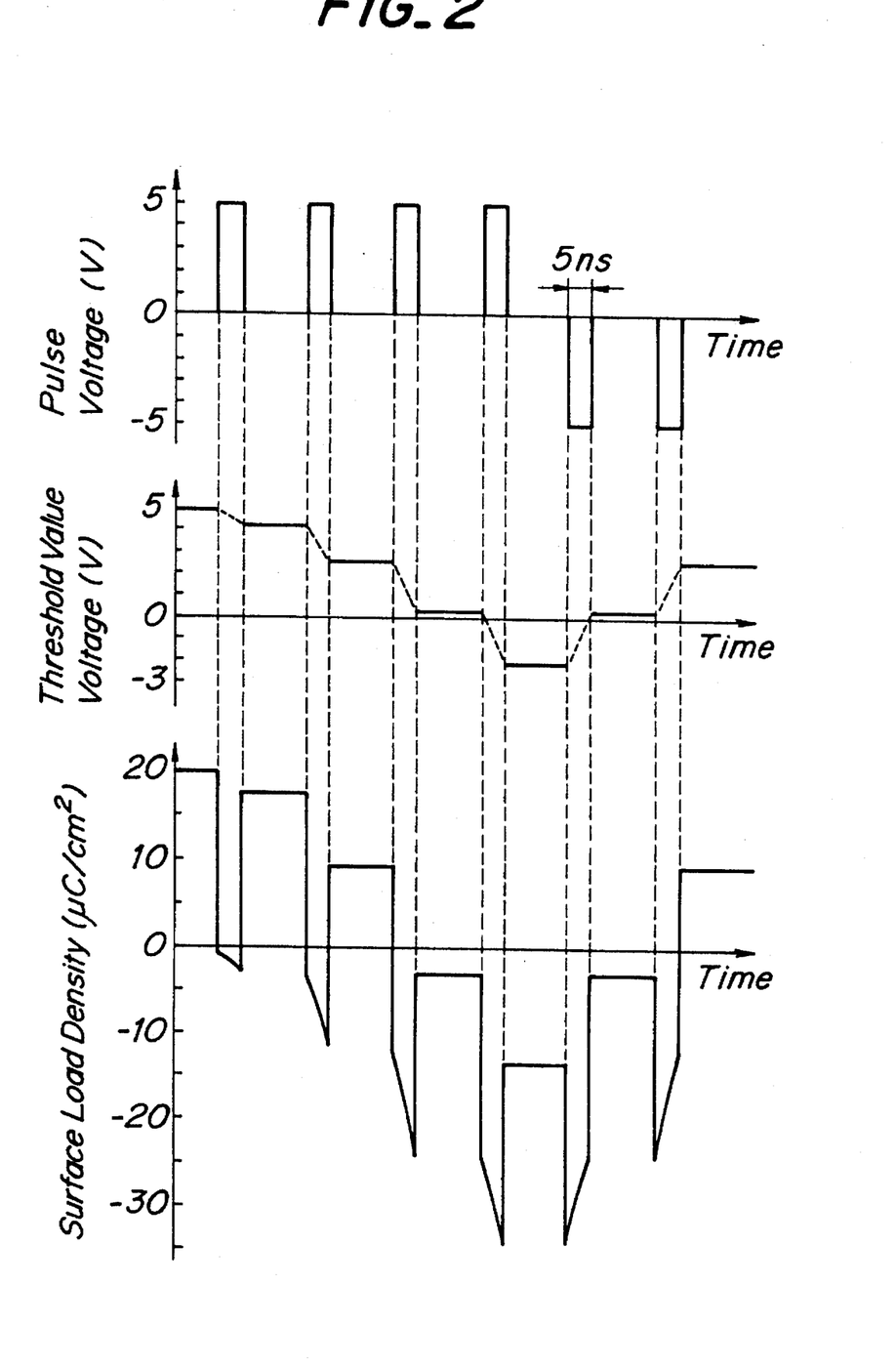
FIG. 2 is a view showing calculation of the threshold voltage of a MIS diode used in the present invention, the charge density of a semiconductor surface and the condition of time elapsed of a pulse voltage.

FIG. 2 shows a calculation example of a threshold voltage of a MIS diode having a metal/ferroelectric film/Si structure and a charge density of a semiconductor surface. For the calculation in FIG. 2, PZT was assumed as a ferroelectric material, and use was made of $P_s$=20 μC/cm² (=1.2×10¹⁴ electron/cm²), ε=500, $E_a$=120 kV/cm, $t_{so}$=12 ns, d=90 nm, $N_A$=1×10¹⁶ cm⁻³ and $V_G$=5 V. It is further assumed that a ferroelectric thin film is completely polarized to make the surface of semiconductor into an accumulation condition at the initial condition. It is understood from FIG. 2 that a hole density of the semiconductor surface decreases every time a signal pulse is input, and an inversion layer is formed on the surface of the semiconductor after applying the third pulse in this example. On the other hand, it is understood that the surface condition of the semiconductor is again changed toward the initial accumulation condition when a negative bias is applied.

Figure 3:
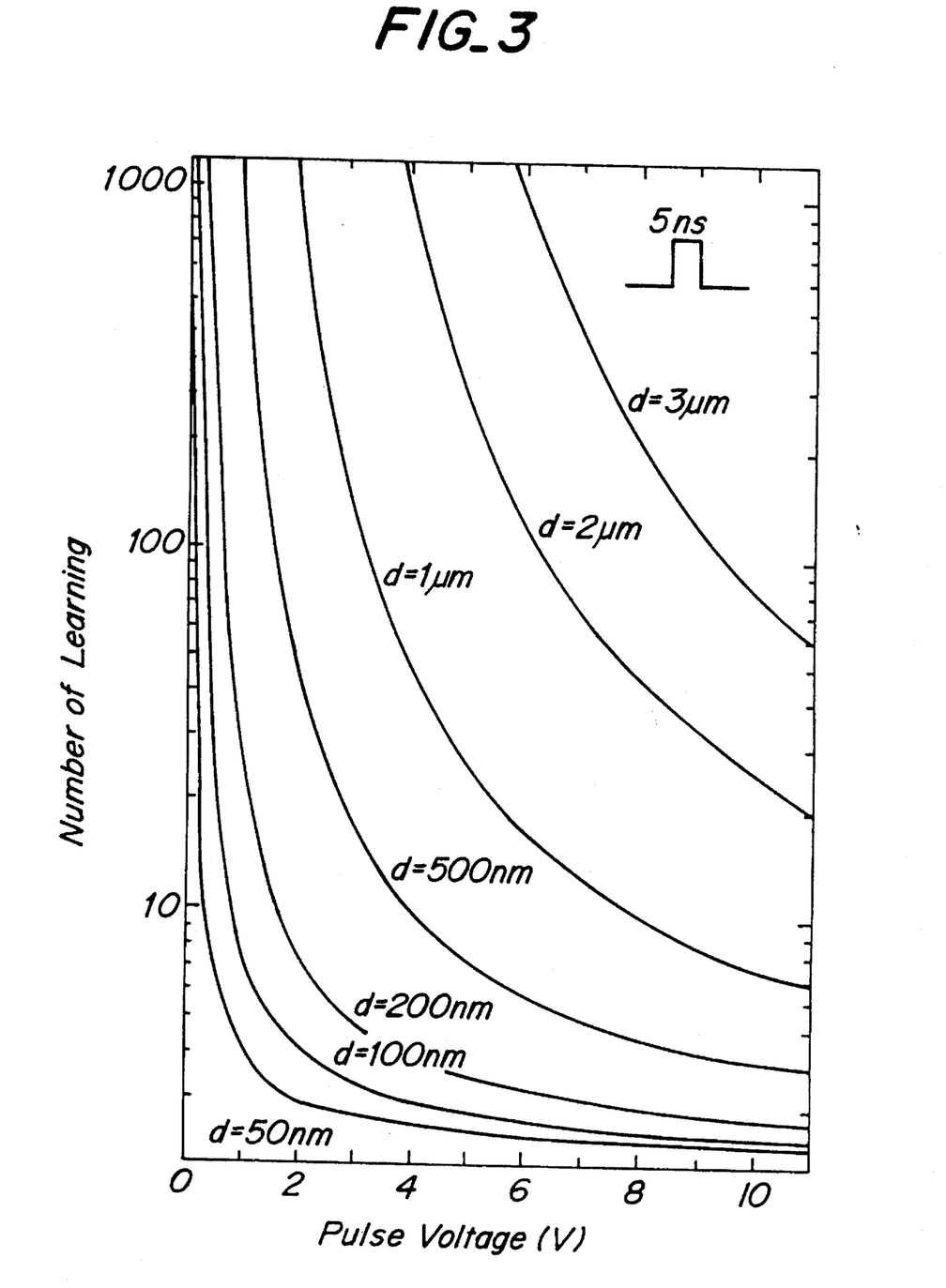
FIG. 3 is a characteristic diagram showing the relation between a pulse voltage (V) applied to the circuit shown in FIG. 1 and learning times.

FIG. 3 shows a relation between the learning times and a gate input voltage, where the learning time is the number of input pulses until an inversion layer is formed on the initially accumulated semiconductor surface. Assumed numerical values are the same as those of FIG. 2. FIG. 3 is usable as a design chart for obtaining the thickness of a gate insulating film when a learning time is designated.

In FIG. 1, 1 is a source electrode, 2 is a drain electrode, 3 is a gate electrode, 4 is a ferroelectric thin film, and 5 is a p type or n type semiconductor made of silicon (Si) and the like on an insulator substrate, and adaptive-learning effect means that the polarization of the ferroelectric thin film is gradually changed and a resistance value between the source electrode 1 and the drain electrode 2 is changed during usual signal pulses are applies to the gate electrode 3.

FIG. 2 shows a calculation data of a threshold voltage of a MIS diode having a metal/ferroelectric film/Si structure and a charge density of a semiconductor surface.

FIG. 3 shows a relation between a pulse voltage (V) applied to a MIS diode and a learning times, wherein "learning time" is the pulse number for changing the Si surface of the MIS diode to an inversion condition. This number is changed by making the width of 1 pulse 5 ns within a range of 50 nm to 3 μm of a film thickness d of the ferroelectric thin film.

Figure 4A:
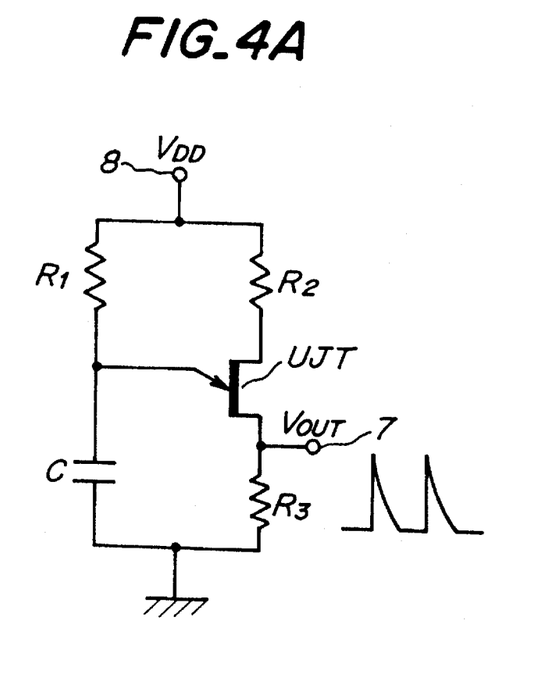
FIG. 4(A) and 4(B) are fundamental circuits of a pulse generator used in the present invention.
Figure 4B:
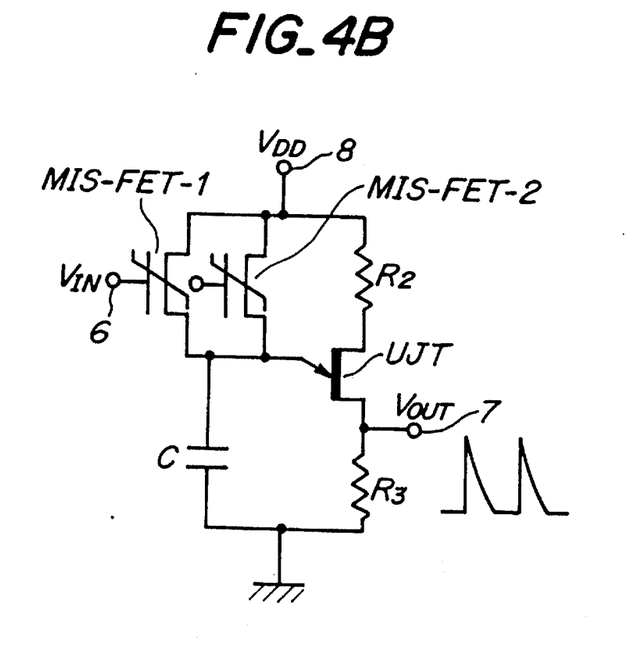

FIG. 4 shows a fundamental circuit of a pulse generator known as a trigger circuit of thyristor. In the circuit of FIG. 4, UJT (unijunction transistor) is used as a switch for discharging a capacitance C, and a pulse interval is determined by a time constant of $CR_1$. Therefore, if a resistance $R_1$ is replaced by a source-drain resistance of adaptive-learning FET, it becomes possible to change an output pulse interval of a neuron circuit. The UJT (unijunction transistor) is a positive feedback type device, so that the neuron circuit is formed with an SOI (i.e Si-on-insulator) structure, and each device should be electrically insulated to not latch up the circuit.

Figure 5A:
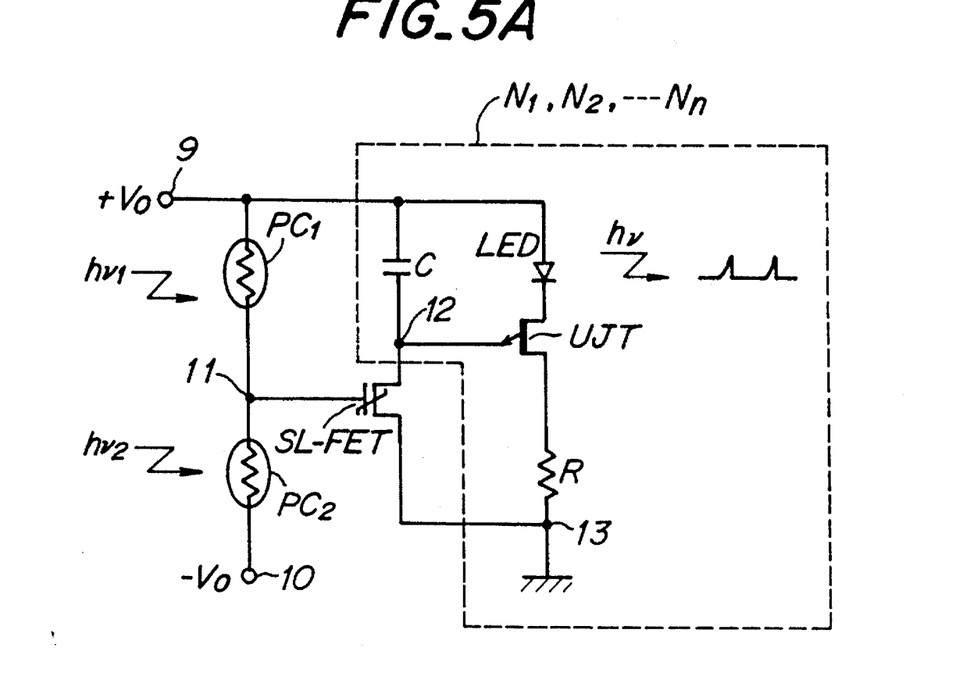
FIG. 5(A) is a circuit showing one embodiment of using an optical information input signal according to the present invention.
Figure 5B:
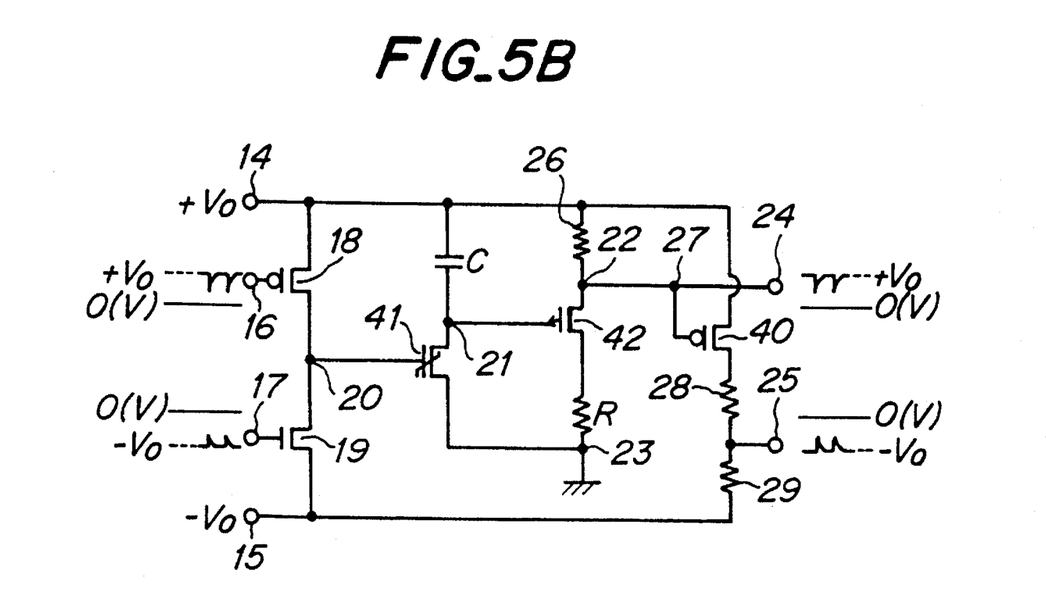
FIG. 5(B) is a circuit showing one embodiment of using an electric information input signal according to the present invention.

FIGS. 5(A) and 5(B) show one embodiment of the present invention, in which a terminal 9 is kept at a source voltage of $+V_0$ and a terminal 10 is kept at a source voltage of $-V_0$, between which an excitatory photoconductor PC1 and an inhibitory photoconductor PC2 are connected in series, an adaptive-learning type FET is connected to its middle point, a capacitance C is connected between the adaptive-learning type FET and the terminal 9, unijunction transistor UJT is connected to its middle point 12, a light emitting diode LED is connected to said capacitance in parallel between the terminal 9 and the unijunction transistor UJT, and a resistance R is connected between the unijunction transistor UJT and a ground terminal 13. Optical information input signals $hv_1$ and $hv_2$ are incident into the excitatory photoconductor PC1 and inhibitory photoconductor PC2, and an optical information output signal hv is output from the LED.

FIG. 5(B) is a circuit which substitutes electric elements for the photoconductors PC1 and PC2 shown in FIG. 5(A). In FIG. 5(B), terminals 14 and 15 are kept at voltages $(+V_0)$ and $(-V_0)$, respectively, switches 18 and 19 consisting of usual MOSFET are connected to the terminals 14 and 15 for switching between source-drain electrodes by a control voltage applied to gates of terminals 16 and 17, an adaptive-learning type MISFET 41 shown in FIG. 1 is connected to a middle point 20 of the FET switches 18 and 19, a capacitance C is connected between a terminal 14 and a terminal 21, a unijunction transistor (UJT) 42 is connected to the terminal 21, a resistance 26 is connected between terminals 14 and 22, R is connected between the unijunction transistor (UJT) 42 and a ground terminal 23, a p channel MOSFET 40 is connected to a middle point 27 of the terminal 22 and an output terminal 24 and an output terminal 25 divided by resistances 28 and 29 is connected to a drain terminal of the MOSFET 40. The other end of the resistance 29 is connected to the terminal 15. In this neural network, an excitatory information input voltage pulse is applied to the terminal 16, an inhibitory information input voltage pulse is applied to the terminal 17, an excitatory information output voltage pulse is output from the terminal 24, and an inhibitory information output voltage pulse is output from the terminal 25.

Figure 6:
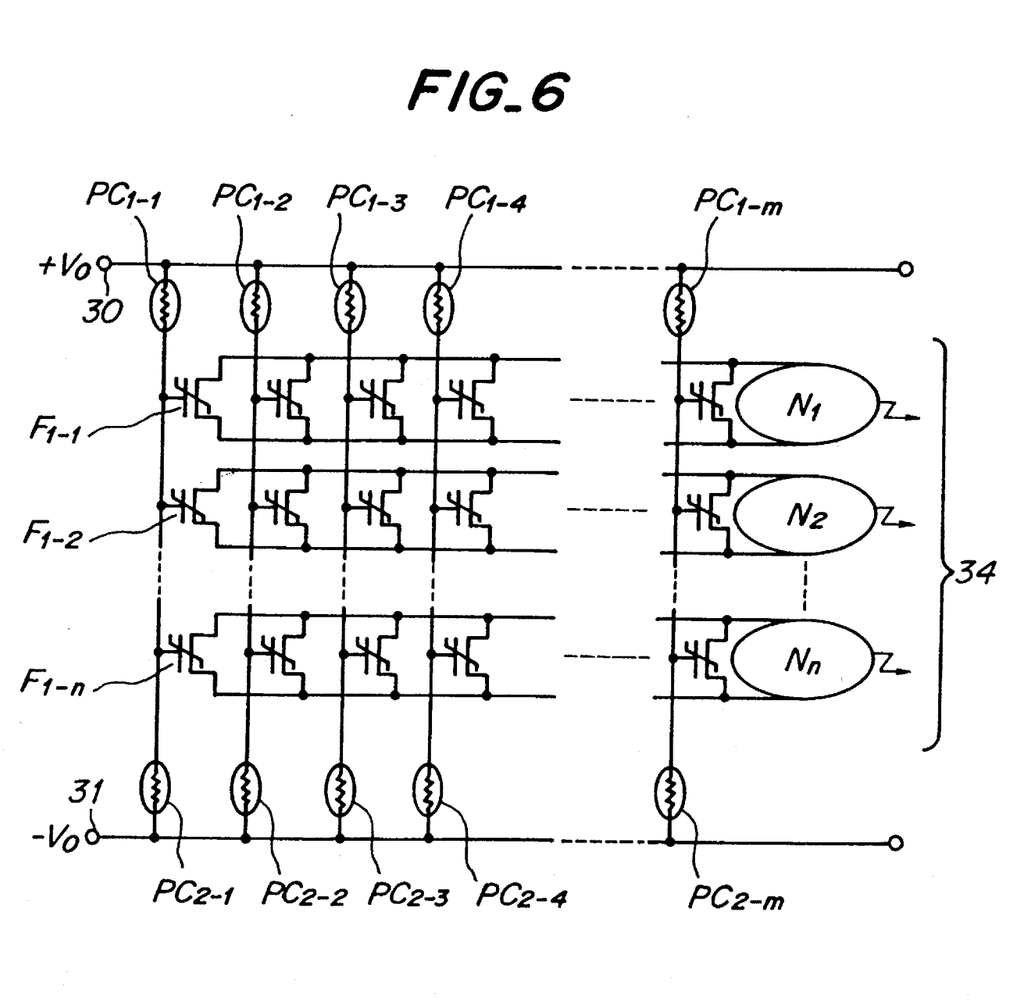
FIG. 6 is a circuit showing one embodiment of applying the present invention to a neuron array with the use of an optical information input signal.

FIG. 6 shows n rows of neuron arrays having m stage excitatory optical input terminals and m stage inhibitory optical input terminals. An excitatory optical information input signal is input into photoconductors of PC1-1, PC1-2, ... PC1-m. An inhibitory optical information input signal is input into photoconductors of PC2-1, ... PC2-m, a photoconductor PC1-1, n rows of the gate electrodes of adaptive-learning type FETs (F1-1, F1-2, ..., F1-n) and a photoconductor PC2-1 are connected in series. Other sets $PC_{1-m}$, $F_{m-1}, F_{m-2}, \ldots, F_{m-n}, PC_{2-m}$ are also connected between source terminals 30 and 31, and further connected neuron circuits $N_1, \ldots N_n$ enclosed with a broken line in FIG. 5(A). This circuit can take outputs simultaneously from n rows of neurons having m stage synaptic connections and its information is taken out of a terminal 34 as an optical output. FIG. 7 shows a circuit of a synaptic layout consisting of such adaptive-learning type FET.

Figure 8:
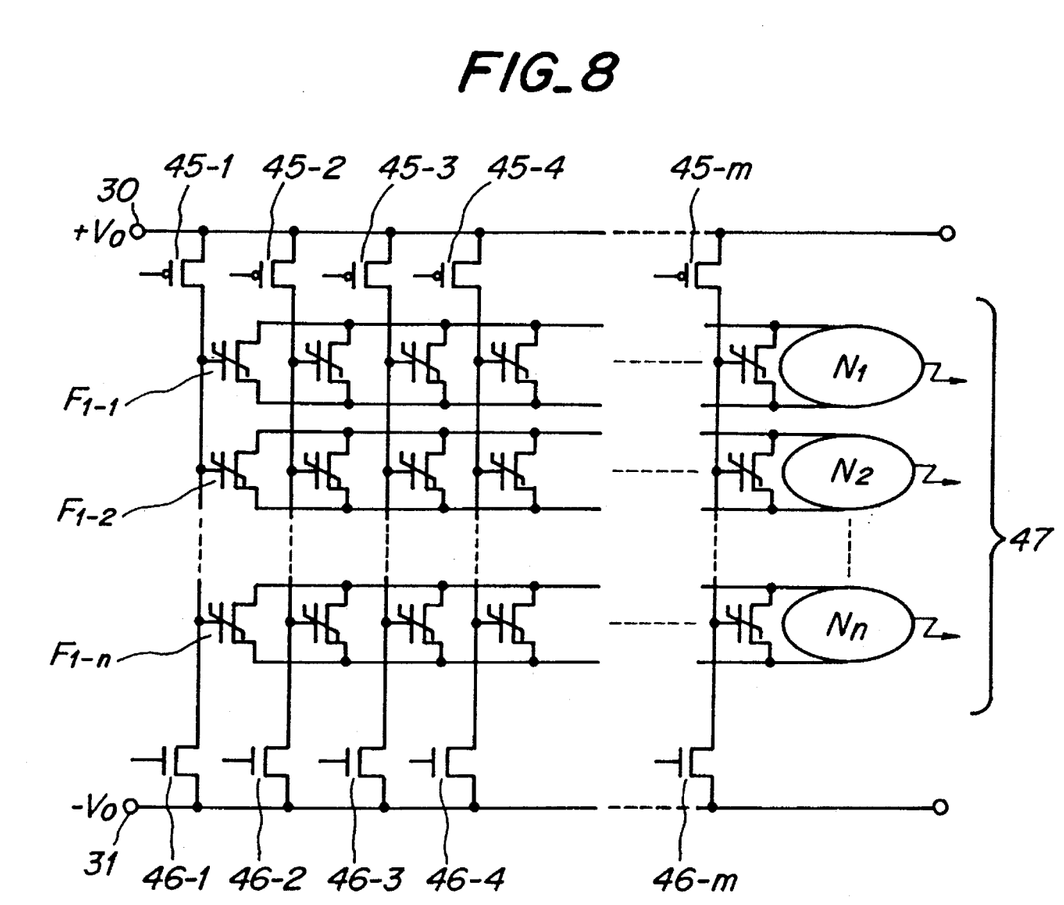
FIG. 8 is a circuit showing another embodiment of applying the present invention to a neuron array with the use of an electric information input signal.

FIG. 8 shows the construction of a neuron array circuit substituting the above photoconductors PC1-1, PC1-2, . . . PC1-m and PC2-1, . . . , PC2-m for FET switches 45-1, 45-2, . . . , 45-m and 46-1, . . . , 46-m, respectively.

Figure 7A:
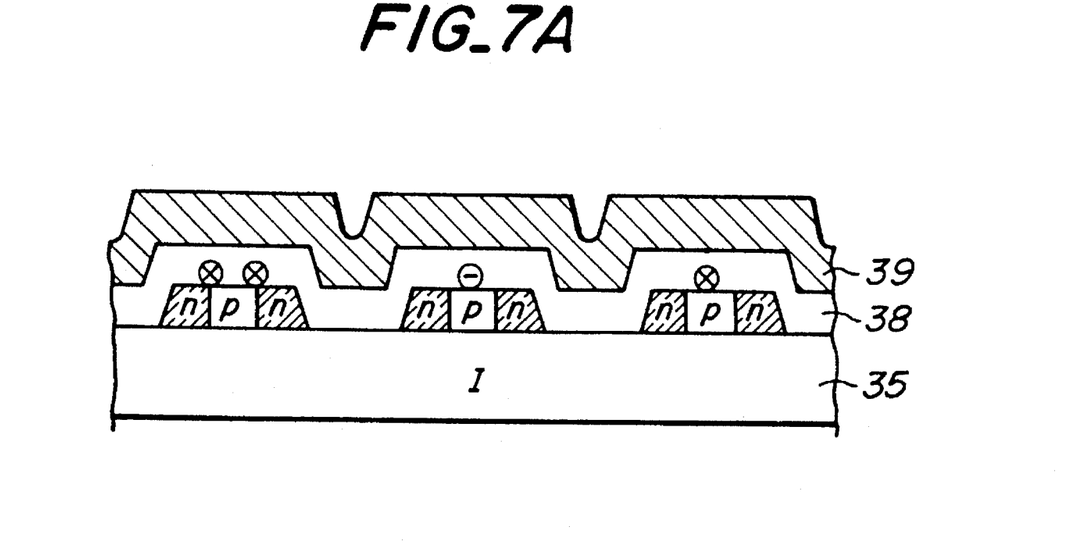
FIGS. 7(A) and 7(B) are a cross-sectional view and a plan view showing one embodiment of an adaptive-learning type product-sum operation circuit in the present invention.
Figure 7B:
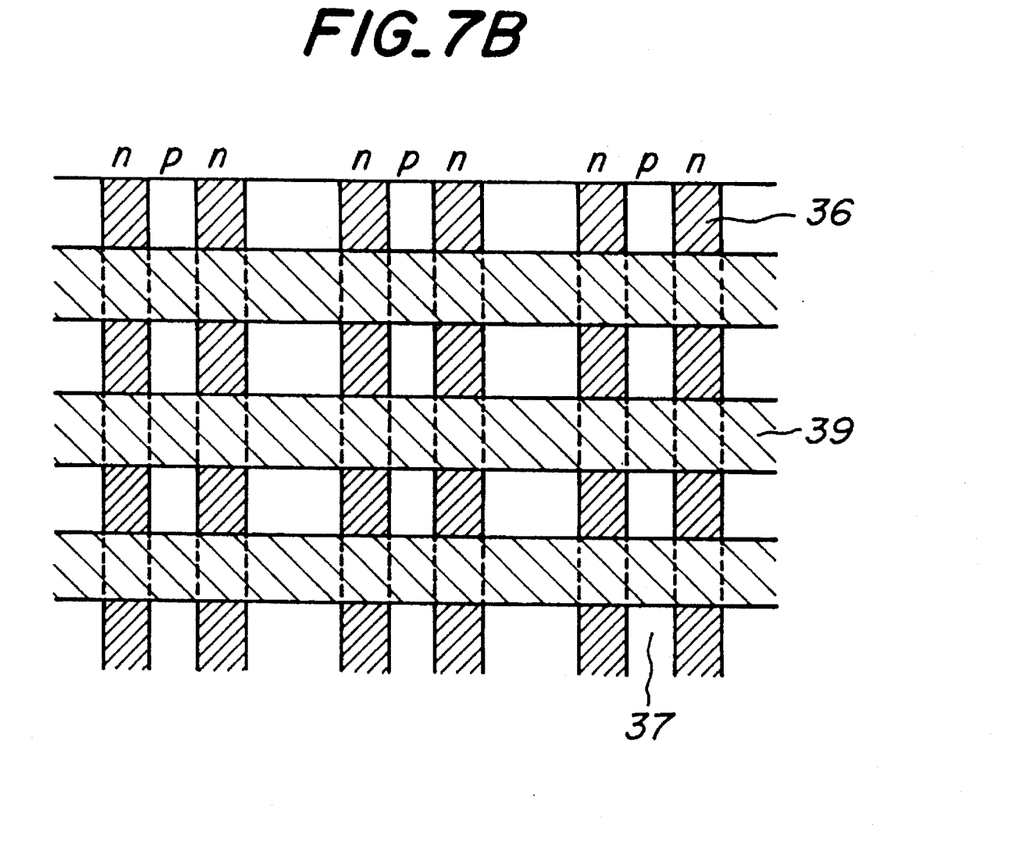

FIG. 7(A) and FIG. 7(B) is a sectional view and a plan view of the circuit arrangement.

FIG. 7(B) shows such a construction that n-p-n or p-n-p Si stripes 36 and 37 are provided on an insulator substrate 35, a ferroelectric film 38 is coated thereon, and a gate electrode 39 is further coated thereon, to make the Si stripes 36, 37 and gate electrode 39 appear as a chess board cross when viewed from the above.

An adaptive-learning type neural network of the present invention was manufactured and a test was conducted for an effect thereof as follows.

(1) Object of the test:—

In the prior neural network, it is most preferable to change a weighting function of synaptic connection in neuron circuit through an adaptive-learning process. In the present test, the work "adaptive-learning" can be defined as a function for changing a part or the whole of electric or optical properties of a device after the device processes a number of signals. In order to attain an object of the present invention, there is required an adaptive-learning neuron circuit having excitatory control device and inhibitory control device.

The adaptive-learning device function returns to the initial value by applying an initializing signal, so that this function is different from the deterioration of the device.

(2) Adaptive-learning type MISFET (metal/insulator/semiconductor junction electric field effect type transistor)

The fundamental device for carrying out the adaptive-learning function is MISFET having a ferroelectric gate insulator thin film as shown in FIG. 1.

In the self-control device, a pulse having a larger voltage than that of a usual signal pulse is applied to a gate electrode because the pulse having the larger voltage changes properties of a thin film. On the other hand, in the adaptive-learning MISFET, a thickness of the ferroelectric thin film is suitably selected for gradually changing a polarity of the thin film by applying a pulse signal. As a result, the normally OFF type FET, where a current does not flow at a gate voltage of zero, at first changes to a normally ON type FET where a current flows at a gate voltage of zero. The device structure can easily be designed by using switch properties of a ferroelectric thin film. An embodiment of this design is as shown in FIG. 3, and in FIG. 3, "learning time" means the number of pulses until the Si surface of a MIS diode changes to the inversion condition.

(3) Neuron circuit

The function of the adaptive-learning type MISFET gradually changes resistance between source-drain or threshold voltage when input pulse signals are applied to the gate, so that it is compatible with an analog circuit. On the other hand, it is necessary to apply a digital pulse signal to the input of the adaptive-learning type FET. In order to connect two concepts ions of the analog output and the pulse input, a system for generating an asynchronous short interval pulse was proposed, which is similar to a current pulse generation system in human brains. This system is called PFM (pulse frequency modulation), and an interval for generating pulses has no periodicity, so that this system is different from a synchronous pulse density neural system which pulse generating time is determined.

FIG. 4 shows a fundamental circuit of a pulse generator which is known as the trigger circuit of thyristor. In FIG. 4, UJT is a unijunction transistor used as a switch for discharging a capacitance C, $R_1$, $R_2$ and $R_3$ are resistances, 7 is an output terminal, and 8 is a bias voltage terminal for charging C through $R_1$. A pulse interval is determined by a time constant of $CR_1$. When this resistance $R_1$ is substituted for source-drain resistances of adaptive-learning type MIS-FET-1 and MIS-FET-2, an interval of output pulses of the neuron circuit can be changed. UJT is a positive feedback type device, so that a neuron circuit is formed with an SOI (Si-on-insulator) structure, and each device should electrically be insulated to not latch up (i.e parasitic thyristor action) in the circuit.

In order to change the output pulse interval for both long and short, a gate input signal having positive and negative polarities is necessary.

A circuit proposed by the present invention is as shown in FIGS. 5(A) and 5(B). In FIGS. 5(A) and 5(B), there is used optical electrical coupling between neuron circuits. Lastly, the FIG. 6 and 7 show a multiple input neuron circuit and a synaptically connected layout in, respectively.

FIG. 6 shows an n row neuron array having an optical coupling. In FIG. 6, each neuron circuit has m stage synaptic connections, which are receivers of signals from respective preceding stages. In this array, adaptive-learning FETs of each neuron circuit are connected in parallel for determining an output pulse interval by a time constant of (capacitance C)×(total resistance R).

FIG. 7 shows a synaptic connection layout. In FIG. 7, an Si stripe having a n-p-n structure in a lateral direction is arranged on an insulator substrate 35, and coated a ferroelectric thin film 38 thereon, while a metal stripe 39 for a gate electrode is arranged on the thin film at a right angle to the Si stripe. In order to weight respective initial synaptic connections separately, a $+V_0/2$ pulse-like bias voltage and a $-V_0/2$ direct current bias are applied to respectively selected metal and Si stripes. As a result, a potential difference applied to the thin film becomes $V_0$ at only the intersection point and exceeds a critical value of polarization, and the degree of polarization, that is, the degree of weight can be controlled by varying a duration of the pulse-like bias. Moreover, when a weighting value is 0, it means that there is no response to input, and it also means the more the weighting value increases, the more the portion thereof is regarded as important.

Since the synapse circuit has no through-hole as shown in FIG. 7, a packing density of the synapse circuit is expected to be very high. Specifically, one synapse region in case of designing a circuit with a rule of the minimum width of 1 micron is about 4×2 $\mu m^2$ (3 μm-width Si stripes, 1 μm-width metal stripes and 1 μm-width space). The region of each neuron circuit is not large, and the region of 1000×1000 synapse connections having 1,000,000 synapses is about 8 $mm^2$. This region is considered to be sufficiently small as compared with the other neural network.

(4) Conclusion

The present inventor has found a novel adaptive-learning neuron circuit. The main conceptions are as follows.

(1) Adaptive-learning type MISFET circuit having a ferroelectric gate insulator.

(2) Asynchronous PFM output circuit.

(3) Excitatory synapse and inhibitory synapse.

(4) High density synapse layout.

(5) Separate determination of initial weighting of synapse.

(6) Optical and electrical connection between neurons.

According to a neuron circuit having a synapse array of the present invention, there is such an advantageously adaptive-learning type neuron circuit which can be manufactured having an interval of output pulses changed by learning by connecting a simple pulse generating circuit consisting of capacitance, resistance, unijunction transistor and the like for instance.

Although the invention has been described with a certain degree of particularity, it is understood that the present disclosure has been made only by way of example and that numerous changes in details may be resorted to without departing from the scope of the invention as hereinafter claimed.

What is claimed is:

1. A product-sum operation circuit element comprising:

an insulator substrate;

at least one single crystal semiconductor thin film region on the insulator substrate, the at least one single crystal semiconductor thin film region extending in a first direction;

a ferroelectric thin film deposited on the insulator substrate for covering at least the at least one single crystal semiconductor thin film region; and an electrode, formed on the ferroelectric thin film, the electrode extending in a second direction and crossing the at least one single crystal semiconductor thin film region;

wherein the at least one single crystal semiconductor thin film region includes first, second and third semiconductor thin film sections;

wherein the first and third sections are of a same conductivity-type and the second section is of a conductivity-type which is the opposite of the conductivity-type of the first and third sections; and wherein the first, second and third semiconductor thin film sections are arranged along the second direction with the second section disposed between the first and third sections.

2. The product-sum operation circuit element according to claim 1, wherein the first and third semiconductor thin film sections are n-type semiconductors and the second semiconductor thin film section is a p-type semiconductor.

3. The product-sum operation circuit element according to claim 1, wherein the first and third semiconductor thin film sections are p-type semiconductors and the second semiconductor thin film section is an n-type semiconductor.

4. An adaptive-type product-sum operation circuit comprising:

an excitatory pulse circuit for producing an excitatory pulse;

an inhibitory pulse circuit for producing an inhibitory pulse; and an adaptive-learning type product-sum operation circuit element including:

an insulating substrate;

a semiconductor thin film layer formed on the insulating substrate;

a ferroelectric thin film layer, having a residual polarization, formed on the semiconductor thin film layer; and an electrode formed on the ferroelectric thin film, the electrode being Coupled to receive the excitatory pulse and to receive the inhibitory pulse;

wherein the ferroelectric thin film layer is responsive to the excitory pulse for increasing the residual polarization by a first predetermined amount and is responsive to the excitatory pulse for decreasing the residual polarization by a second predetermined amount;

wherein the semiconductor thin film layer extends in a first direction, and the electrode extends in a second direction and crosses the semiconductor thin film layer;

wherein the semiconductor thin film layer includes first, second and third semiconductor thin film regions;

wherein the first and third regions are of a same conductivity-type and the second region is of a conductivity-type which is the opposite of the conductivity-type of the first and third regions; and wherein the first, second and third semiconductor thin film regions are arranged along the second direction with the second region disposed between the first and third regions.

5. The adaptive-type product-sum operation circuit according to claim 4, wherein the first and third semiconductor thin film regions are n-type semiconductors and the second semiconductor thin film region is a p-type semiconductor.

6. The adaptive-type product-sum operation circuit according to claim 4, wherein the first and third semiconductor thin film regions are p-type semiconductors and the second semiconductor thin film region is an n-type semiconductor.

7. A semiconductor circuit element comprising:

an insulator substrate;

a plurality of single crystal silicon semiconductor thin film stripes formed on the insulator substrate and extending in parallel fashion in a first direction, each one of said plurality of stripes being comprised of first and second semiconductor regions of a first conductivity-type and a third semiconductor region of a second conductivity-type disposed adjacent to and between said first and second semiconductor regions;

a ferroelectric thin film deposited on the insulator substrate and covering the plurality of single crystal silicon semiconductor thin film stripes; and a plurality of electrode stripes, formed on the ferroelectric thin film and extending in parallel fashion in a second direction perpendicular to said first direction, each electrode stripe crossing a respective first, second and third semiconductor region of a respective one of the plurality of single crystal silicon semiconductor thin film stripes.

8. The circuit element according to claim 7, wherein the plurality of electrode stripes are electrodes for receiving excitatory pulses from excitatory pulse circuits and for receiving inhibitory pulses from inhibitory pulse circuits, and wherein the ferroelectric thin film is responsive to the excitatory pulses for increasing residual polarization by a first predetermined amount and is responsive to the inhibitory pulses for decreasing the residual polarization by a second predetermined amount, the circuit element thereby being an adaptive-learning type product-sum operation circuit.

* * * * *